(12) United States Patent
Weng et al.

(10) Patent No.: US 7,716,056 B2
(45) Date of Patent: May 11, 2010

(54) METHOD AND SYSTEM FOR INTERACTIVE CONVERSATIONAL DIALOGUE FOR COGNITIVELY OVERLOADED DEVICE USERS

(75) Inventors: Fuliang Weng, Mountain View, CA (US); Lawrence Cavedon, San Francisco, CA (US); Badri Raghunathan, San Francisco, CA (US); Danilo Mirkovic, Stanford, CA (US); Laura Hiatt, Sanford, FL (US); Hauke Schmidt, San Bruno, CA (US); Alexander Gruenstein, Lafayette, CA (US); Stanley Peters, Menlo Park, CA (US)

(73) Assignees: Robert Bosch Corporation, Illinois, IL (US); Volkswagen of AmericaMI (US)

( * ) Notice: Subject to any disclaimer, the term of this patent is extended or adjusted under 35 U.S.C. 154(b) by 1223 days.

(21) Appl. No.: 10/952,069

(22) Filed: Sep. 27, 2004

(65) Prior Publication Data
US 2006/0074670 A1   Apr. 6, 2006

(51) Int. Cl.
G06F 17/21 (2006.01)
G06F 17/27 (2006.01)
G10L 13/08 (2006.01)
G10L 21/00 (2006.01)

(52) U.S. Cl. .............. 704/275; 704/9; 704/10; 704/260

(58) Field of Classification Search .......... 704/260, 704/275
See application file for complete search history.

(56) References Cited

U.S. PATENT DOCUMENTS 4,706,212 A * 11/1987 Toma ................ 704/2

(Continued)

FOREIGN PATENT DOCUMENTS

EP   1 079 371 A1   2/2001

OTHER PUBLICATIONS

International Search Report for PCT/US05/028749, Date of Mailing Jun. 12, 2005.

(Continued)

*Primary Examiner*—David R Hudspeth
*Assistant Examiner*—Justin W Rider
(74) *Attorney, Agent, or Firm*—Kenyon & Kenyon LLP

(57) ABSTRACT

A system and method to interactively converse with a cognitively overloaded user of a device, includes maintaining a knowledge base of information regarding the device and a domain, organizing the information in at least one of a relational manner and an ontological manner, receiving speech from the user, converting the speech into a word sequence, recognizing a partial proper name in the word sequence, identifying meaning structures from the word sequence using a model of the domain information, adjusting a boundary of the partial proper names to enhance an accuracy of the meaning structures, interpreting the meaning structures in a context of the conversation with the cognitively overloaded user using the knowledge base, selecting a content for a response to the cognitively overloaded user, generating the response based on the selected content, the context of the conversation, and grammatical rules, and synthesizing speech wave forms for the response.

30 Claims, 10 Drawing Sheets

U.S. PATENT DOCUMENTS

| | | | |
|---|---|---|---|
| 5,267,323 | A | 11/1993 | Kimura |
| 6,199,034 | B1 * | 3/2001 | Wical .............................. 704/9 |
| 6,292,767 | B1 | 9/2001 | Jackson et al. |
| 6,311,152 | B1 * | 10/2001 | Bai et al. ........................ 704/9 |
| 6,505,057 | B1 * | 1/2003 | Finn et al. ................. 455/569.2 |
| 2003/0061029 | A1 | 3/2003 | Shaket |
| 2003/0216919 | A1 * | 11/2003 | Roushar ..................... 704/260 |
| 2004/0078190 | A1 * | 4/2004 | Fass et al. ....................... 704/7 |
| 2005/0021317 | A1 | 1/2005 | Weng et al. |
| 2006/0015484 | A1 | 1/2006 | Weng et al. |
| 2006/0041378 | A1 | 2/2006 | Cheng et al. |

OTHER PUBLICATIONS

Brown P. et al., "Class-Based n-gram Models of Natural Language", Association for Computational Linguistics, 1992.

Clark B. et al., "Automated Tutoring Dialogues for Training in Shipboard Damage Control", In Proc.SIGdial 2001.

Dermatas E. et al. "Automatic Stochastic Tagging of Natural Language Texts", computational Linguistics, VI. 21, No. 2, 1995.

Gruenstein A. et al., "Using an Activity Model to Address issues in Task-Oriented Dialogue Interaction over Extended Periods", AA1 Spring Symposium on Interaction Between Humans and Autonomous Systems Over Extended Operation, Mar. 2004.

Jackson E. et al, "A Template Matcher for Robust Natural Language Interpretation", Darpa Speech and Natural Language Workshop, 1991.

Larsson S. et al. "Information State and Dialogue Management in the TRINDI Dialogue Move Engine Toolkit", Natural Language Engineer, 6(3-4) 2000.

Lemon O. et al. "Collaborative Activities and Multi-Tasking in Dialogue Systems", Traitement Automatique des Langues (TAL) 43 (2), 2002.

Maglio P.P. et al. "On Understanding Discourse in Human-computer interaction" Proc. 24$^{th}$ Annual Conf. of Cognitive Science Soc. 2001.

Rayner M. et al. "Plug and Play Speech Understanding", In Proc. SIGdial, 2001.

Venkataraman A. et al., Training a Prosody-based Dialog Act Tagger From Unlabeled Data, IEEE Intl. Conf. on Acoustics, Speech and Signal Processing, 2003.

Weng F. et al., "Developing a Conversational Dialogue System for Cognitively Overloaded Users".

Weng F. et al., "Parsing a Lattice with Multiple Grammars".

Zhou Y. et al., "A Fast Algorithm for Feature Selection in Conditional Maximum Entropy Modeling".

* cited by examiner

1. User: What music do you have?
   System: I have pop, rock and soul music. <Using category names instead of enumerating all the songs>
2. User: what about some rock.
   System: Ok. Here's the song *one world* <System Behavior: Plays a random rock music selection>
3. User: Who is this?
   System: This is *Dire Straits*. <Querying context dependent information>
4. User: What albums do you have by *Dire Straits*?
   System: *Brothers In Arms*. <Discontinuous phrase>
5. User: What songs are on *Brothers in Arms*?
   System: *Brothers in Arms* has the songs *one world, why worry, brothers in arms, money for nothing, so far away <...>*
6. User (interrupting): Play that.
   System: <starts playing *so far away*>
7. User: I meant *money for nothing*.
   System: <starts playing *money for nothing* instead>
8. User: Add this to a playlist.
   System: Which playlist do you mean? I have Drivetime and WorkSongs. <disambiguation>
9. User: What's on Drivetime?
   System: *combination, believe* and *love is the groove*
10. User: Add it to Drivetime.
    System: Ok, added *money for nothing* to playlist Drivetime. <multi-threaded with adding a song to a playlist vs. clarifying a playlist>
11. <user plugs in USB memory containing MP3 DB>
    System: You have 28 new songs. <it is updated dynamically, and the user can query/play the new songs>

Figure 2

```
// play a song
// Plays a single song or a playlist/album.
// There are 3 cases:
// 1) Play a song already in the master list
// 2) Add a song or a playlist, and play it. In case of a playlist, we want
// to save its beginning index (e.g. an album which we can replay later).
taskdef<play, "play">
{
    DefinableSlots {
        required objectID
        fillQuestion "What would you like me to play?" {
            "command(play,param_list(arg(np:answerNP)))";
        }
        disambigQuestion "which one?" {
            "command(play|start|want|like|mean,param_list(arg(np:answerNP)))";
            "revision(replace(arg(np:answerNP)))"; // i mean foo
        }
    }
    MonitorSlots {
        curPlaylist;
        curSong;
        curIndex;
        curState;
    }
    LanguageMappings {
        // the following are language templates that this action is triggered by
        // simplest case: "play NP" -- could be a name, a pronoun, a description, etc
        "command(play,param_list(arg(np:objectID)))";
        "command(play,param_list(arg(np:objectID),mod(*)))";

// skip|switch|go|move to song x
        "command(switch|go|move|skip,param_list(pp(to,arg(np:objectID))))";
        // note: without arguments skip|switch|go|move should map to "next"

// listen to (song X | the next song) -- gets returned by "can I listen to ..."
        "command(listen,param_list(pp(to,arg(np:objectID))))";

// "put on X"
        "command(put,param_list(pp(on,arg(np:objectID))))";

"command(start,param_list(arg(np:objectID)))";
        "command(try|want|need|re-play,param_list(arg(np:objectID)))";
    }
}
```

Figure 3

```
public boolean processProps(Task t, MultiDeviceTaskProperties props, int lfRelation) {
    Collection c = getDevicePossibilities(t, props);

//if can be handled by the device in context,
    //go for it.
    MultiDevice context = getDeviceInContext();
    if(c.contains(context)) {
        c.clear();
        c.add(context);
    }

//if more than one possible match ask about it
    if(c.size() > 1) {
        t.setMyProperties(props);
        ArrayList possibilities = new ArrayList();
        Iterator it = c.iterator();
        while(it.hasNext()) {
            String type =
                ((MultiDevice)it.next()).getDeviceType();
            if(!possibilities.contains(type))
                possibilities.add(type);
        }
        if(possibilities.size() > 1) {
            t.getManager().getSystemAgenda().add(
                alt_query);
            return true;
        }
    }

//you've got a single match, go with it.
    if(c.size() == 1) {
        MultiDevice cur_device =
            (MultiDevice) c.toArray()[0];
        if(processPropsCorrectly(t, cur_device,
            props, lfRelation)) return true;
    } return false;
}
```

Figure 6

User: Find a restaurant in Palo Alto.
DM: Shall I use the GPS locator to find a specific restaurant, or shall I find a restaurant matching your criteria?
User: Use the GPS locator.
DM: OK.
DM: Which restaurant would you like to locate?
User: The Cheesecake Factory.
DM: OK.
DM: The Cheesecake Factory is located on University Ave.
DM: What else can I do for you?

Figure 7

METHOD AND SYSTEM FOR INTERACTIVE CONVERSATIONAL DIALOGUE FOR COGNITIVELY OVERLOADED DEVICE USERS

FIELD OF THE INVENTION

The present invention relates to a method and system for interactive conversational dialogue for cognitively overloaded device users.

BACKGROUND INFORMATION

Systems with spoken dialogue interfaces have gained increasing acceptance in a wide range of applications. However, spoken dialogue interface systems may use restricted language and scripted dialogue interactions. In particular, spoken language dialogue systems may involve narrowly focused language understanding and simple models of dialogue interaction. Real human dialogue, however, may be highly context- and situation-dependent, full of ill-formed utterances and sentence fragments, and may be highly interactive and collaborative. For example, speakers may interrupt each other, finish each others' sentences, and jointly build contributions to the shared context.

Understanding language and modeling natural dialogue may be important in building friendly spoken-language interfaces, and may be critically important in settings where the user is focused on external tasks, such as flying a helicopter or driving a car. In such scenarios, users may not be able to plan their utterances ahead of time or "hold that thought" until an appropriate time. Instead, users may need to be able to interrupt the dialogue system and issue instructions that build on the context and situation. Conversely, the dialog system must interpret these contributions in context and should only interrupt the user when appropriate (such as, for example, in critical situations), and any questions from the system should be as focused as possible. Accordingly, speech interfaces in highly stressed or cognitively overloaded domains, i.e. those involving a user concentrating on other tasks, may require a more flexible dialogue with robust, wide-coverage language understanding In the automotive industry, for example, dialogue systems may offer command and control for devices. However, these systems may rely on key word spotting techniques and finite state techniques for language understanding and dialogue management. These systems may also encounter difficulties associated with updating a new database or porting to a new device/application. Accordingly, due to the limitations of the technologies used by these systems, only constrained spoken language expressions may be handled. Furthermore, the more frequently occurring language phenomena, such as, for example, pronouns, ambiguity, and revisions, may not be processed properly.

SUMMARY OF THE INVENTION

An exemplary embodiment and/or exemplary method of the present invention provides an exemplary dialog system and/or method that is flexible, allows users to verbally interact with a variety of devices, and is capable of rich dialogue with full spoken language understanding, multi-threaded dialogue management, dynamic update of information, recognition of partial proper names, and allows easy and efficient plug-n-play domain porting.

In this regard, the exemplary dialog system and/or exemplary method according to the present invention understands certain language phenomena, which may be pervasive in human dialogs but may not be easily handled by existing technologies. In particular, the exemplary dialog system according to the present invention may provide full language analysis, in which the exemplary system understands the subtleties in non-content words, such as "a", "the", "this", "that" and "other". Moreover, an exemplary dialog system may provide situation- and context-dependent interpretation of user utterances.

An exemplary embodiment and/or exemplary method of the present invention may provide dynamic updates so that devices and information content may be added or extended dynamically. In this regard, the present invention may use a set of technologies that allow dynamic update of new content and a fast adaptation to new domains. The exemplary embodiment and/or exemplary method of the present invention may increase the ease of the user to the user in terms of managing explosive amount of content, and may consequently speed up the market acceptance of the technologies. The exemplary embodiment and/or exemplary method of the present invention makes possible a number of applications, and allows companies to quickly adding new applications so they may gain market share in industries, such as, for example, automotive, hand-held devices, and cell-phones. The exemplary embodiment and/or exemplary method of the present invention uses a new set of technologies that allows dynamic content updates and provides the user more convenience in managing the their favorite content items. The new technologies may also allow a developer/company to come up with new applications in more quickly and a cost-effective manner.

The exemplary system and/or exemplary method of the present invention may include a statistical natural language understanding (NLU) module to provide robust full sentence analysis, and a dialogue manager (DM) to support context-dependent interpretation and manage user-system interaction. An exemplary system and/or exemplary method of the present invention may provide robustness in the face of imperfect input from a Speech Recognition (SR) module and human users, including, for example, input involving incomplete references to partial proper names.

An exemplary dialog system and/or exemplary method of the present invention may support a dialogue involving control of an MP3 music-player (a domain with challenges in dealing with proper names), a cellular telephone, a navigation system and/or other point-of-interest (POI) services.

BRIEF DESCRIPTION OF THE DRAWINGS

FIG. 2 shows a simple dialog between a user and the exemplary system of FIG. 1A, involving the control of an MP3 music player.

FIG. 3 shows exemplary pseudo code for an exemplary activity model and language mapping implementation.

FIG. 6 shows an exemplary dialog between the exemplary system of FIG. 1 and a user of the exemplary system.

FIG. 7 shows an exemplary pseudo code for an exemplary task assignment procedure performed by the exemplary system of FIG. 1.

DETAILED DESCRIPTION

Figure 1A:
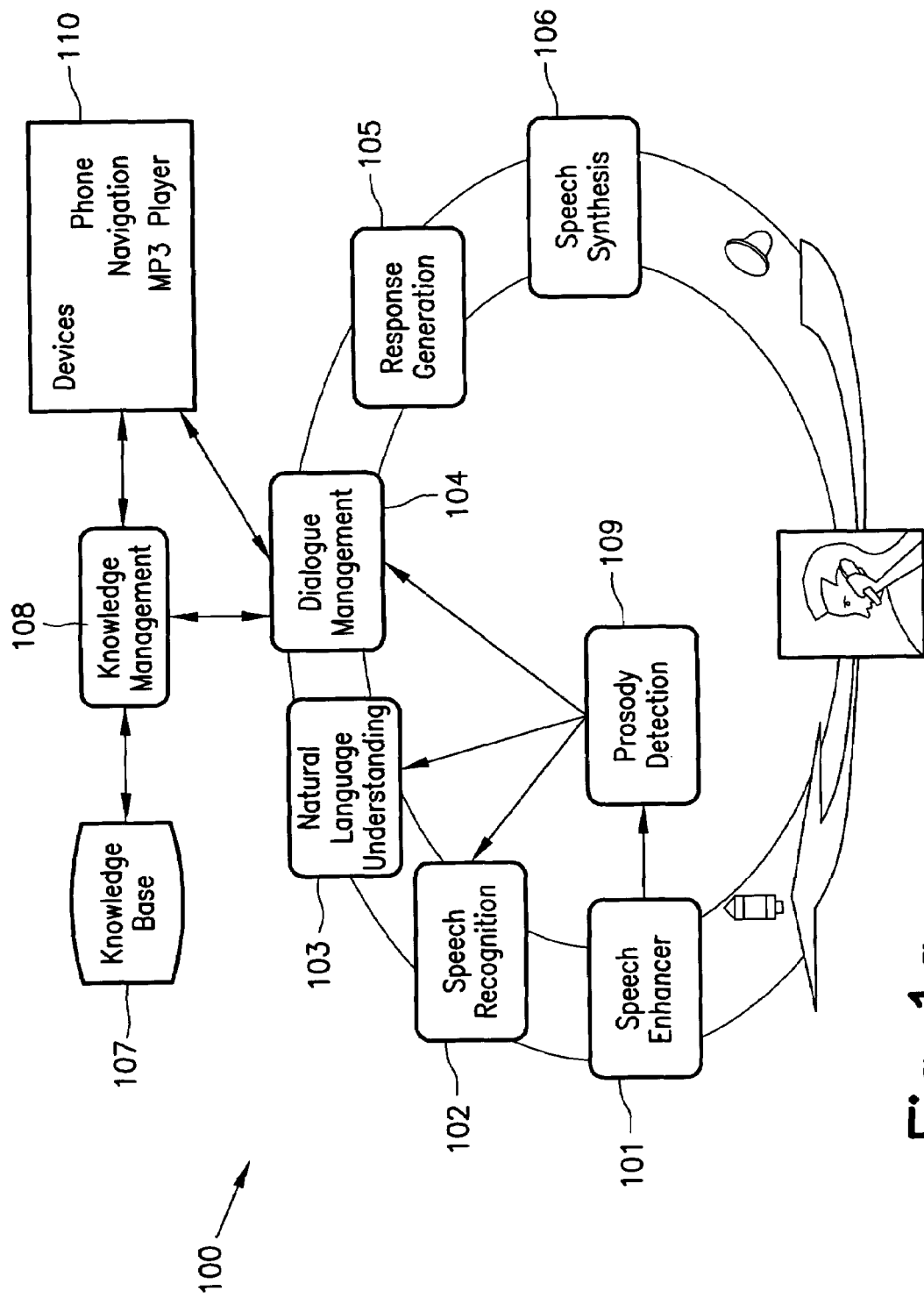
FIG. 1A shows an exemplary dialog system according to the present invention.

FIG. 1 shows an exemplary conversation dialogue system 100 to provide end-to-end spoken language processing for user interaction with multiple devices 151. The exemplary system 100 includes a speech enhancer module 101, a speech recognition module 102, a natural language understanding (NLU) module 103, a dialogue management module 104, a response generation module 105, a speech synthesis module 106, a knowledge base module 107, a knowledge management module 108, a prosody detection module 109, and a device/application manager 110.

The speech enhancer module 101 enhances the speech received by the exemplary dialog system 100. In particular, the enhancer module 101 may provide, for example, noise reduction and/or echo cancellation.

The speech recognition module 102 receives acoustic signals and outputs a sequence or a lattice of words with additional labels, such as, for example, confidence scores. In this regard, the speech recognition module 102 may include a Nuance speech recognition engine with class-based n-grams and dynamic grammars. N-grams relate to the statistical algorithms that relate words and classes based on probabilities. The natural language understanding module 103 receives the sequence or lattice of words with attached confidence scores and outputs a structured meaning representation based on a statistical model trained on in-domain linguistic data. In this regard, the natural language understanding module 103 is intended to provide a flexible and robust spoken language capability.

The dialogue management module 104 takes the structured meaning representation and issues appropriate instructions to other modules based on the context of the conversation and knowledge obtained from the knowledge base 107.

The knowledge base 107 stores knowledge regarding, for example, the user, the devices, the external environment, and the current contextual situation. The knowledge base 107 may include one or more databases, including, for example, both relational and ontological databases. In particular, the knowledge base 107 may include, for example, a database of ontological relationships among songs, genre, artists, and other attributes. The knowledge base 107 may also include, for example, a database of ontological relationships for navigation tasks and point of interest (POI) services. In this regard, the knowledge base 107 may acquire domain data/knowledge to train the statistical models used in language understanding. The domain data/knowledge may include, for example, statistics for profiling and predicting users' behavior. The knowledge base 107 may also include linguistic knowledge to resolve, for example, ambiguities. In this regard, the linguistic knowledge may be constructed, for example, from generally available dictionaries and other sources, including, for example, the Longman Dictionary of Contemporary English (LDOCE) published by Longman Publishing Corp. or Word-Net—an open resource provided by Professor George Miller and his associates at Princeton University (see the Princeton University Website under the Cognitive Science Group).

The knowledge management module 108 manages the knowledge base 107, the general ontology, the domain-specific ontology, and any databases for any active domain. The knowledge management module 108 also updates and synchronizes the current knowledge base 107 among different modules.

The response generation module 105 takes content from the dialog management module 104, selects the relevant parts in this context, and organizes them in succinct and grammatical manner for input to the speech synthesis module 106. In this regard, a content selection method may be used, which is described, for example, in U.S. patent application Ser. No. 10/923,590, entitled "METHOD AND SYSTEM FOR ADAPTIVE NAVIGATION USING A DRIVER'S ROUTE KNOWLEDGE", which was filed on Aug. 20, 2004, the entire disclosure of which is incorporated by reference herein.

The speech synthesis module 106 takes a word sequence with tagged features and produces speech waveforms. In particular, the speech synthesis module 106 may include a text-to-speech (TTS) engine implemented, for example, using a Nuance Vocalizer.

The prosody detection module 109 provides additional features, such as, for example, detection of intonation, pause and duration, to improve the performance of certain modules of the exemplary system 100, including, for example, the speech recognition module 102, the natural language understanding module 103 and the dialog manager module 104. In this regard, the techniques described by Venkataraman et al. in "Training a prosody-based dialog act tagger from unlabeled data", IEEE Intl. Conf. on Acoustics, Speech and Signal Processing, 2003, may be used.

The exemplary system dialog system 100 may be implemented in a decentralized manner. For example, rather than a hub architecture employed by other systems as described, for example, by Seneff et al. in "Galaxy-II: A Reference Architecture for Conversational System Development", Proc. ICLSP '98, 1998, the exemplary system 100 may be configured in a distributed manner with an event-based, message-oriented middleware to allow for example, dynamic registration of new modules and/or devices 151.

The exemplary dialogue system 100 may use off-the-shelf components. In particular, portions of the exemplary dialogue system 100 may be implemented using Microsoft Visual C++ 6.0, Nuance Vocalizer 4.0, and Nuance Recognizer 8.5. The exemplary dialog system 100 may include, for example, any suitable processing arrangement, such as, for example, a personal computer with an Intel-based microprocessor. The suitable processing arrangement may be supported, for example, by a wide variety of operating and/or application development environments, including, for example, a Microsoft Windows version 2000 or Linux-based environment. It will be appreciated that modules 101 to 109 of the exemplary dialog system 100 may be co-located on a common platform, or alternatively some or all of these modules may reside separately.

The NLU Module

Figure 1B:
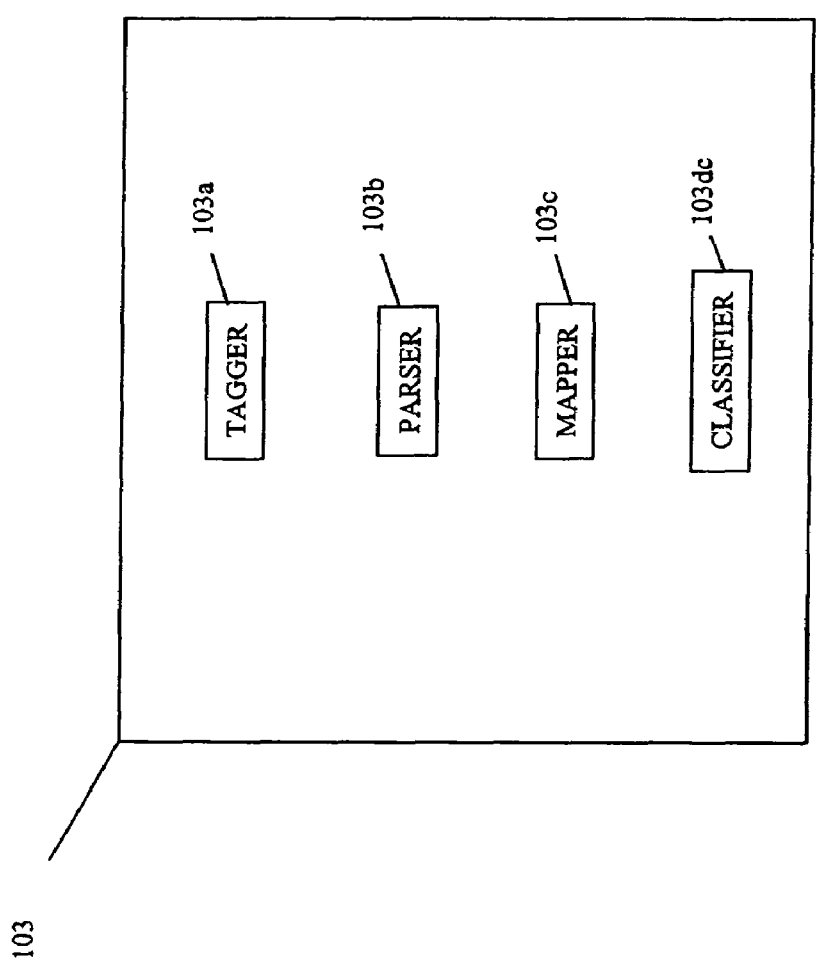
FIG. 1B shows an exemplary natural language understanding module.

FIG. 1B shows an exemplary natural language understanding module 103 to provide a flexible and robust spoken language capability. The exemplary natural language understanding module 103 includes four sub-modules: a statistical tagger 103a, a statistical dependency parser 103b, a feature mapper 103c, and a semantic classifier 103d.

The statistical tagger 103a uses Hidden Markov Models (HMM) to describe probabilities in predicting part of speech (POS) tags based on history. The models may be trained, for example, from dependent and/or annotated text data. In this regard, the statistical tagger 103a may implemented, for example, using techniques as described by Dermataso and Kokkinakis in "Automatic Stochastic Tagging of Natural Language Texts", Computational Linguistics, Volume 21, No. 2, 1995, and a Viterbi algorithm may be used to find a suitable tag sequence.

The statistical dependency parser 103b uses the statistical probabilities described the statistical tagger 103a to build a language model that includes a conditional probability component and a mutual information component. The conditional probability component estimates the probability of the grammatical relation of two heads given their two corresponding subtrees. It may be computed using the selective gain computation (SGC) method for conditional maximum entropy modeling as described, for example, in U.S. patent application Ser. No. 10/613,366 entitled "A FAST FEATURE SELECTION METHOD AND SYSTEM FOR MAXIMUM ENTROPY MODELING", which was filed on Jul. 3, 2003, the entire disclosure of which is incorporated by reference herein.

Maximum Entropy (ME) modeling is a general statistical modeling paradigm that may be applied in language modeling and natural language processing to predict linguistic behavior by incorporatinge various informative certain features, each encoding some linguistically statistical event from a corpus of data into a common framework of conditional models. In this regard, the conditional maximum entropy model may take the form:

$$p(y|x) = \frac{1}{Z(x)} \exp\left(\sum_j \lambda_j f_j(x, y)\right)$$

where y is a grammatical relation, x represents the left and right subtrees as defined by a ten-dimensional array that contains head words, tags, and grammatical relations, and $f_j(x,y)$, $\lambda_j$, and $Z(x)$ are the features, weights, and normalization factors, respectively.

The mutual information component characterizes the redundancy between the representatives of the left and right subtrees, and may be computed through the factorization of the head tags and conditional mutual information of the words given tags.

The feature mapper 103c takes the dependency relations from the statistical dependency parser 103b and produces an Extensible Markup Language (XML) representation of feature structures similar to an f-structure. In the representation, head words, predicates, various modifiers, and sentential features, such as mood, aspect, and tense, are explicitly listed. The mapping is based on a set of patterns of the heads and the modifiers. The patterns may include words, tags, or grammatical relations.

Unlike other prior dialogue systems, the natural language understanding module 103 provides robust full analysis of an input sentence. Not only are conventionally perceived content words extracted, but so are the subtle meanings of various other words. For example, the articles "a", "the", "this", "that" and "other" are differentiated by the natural language module 103 and interpreted appropriately by the dialogue management module 104. It is believed that such articles are ignored by the template matchers of other prior systems, including, for example, those described by Jackson et al. in "A Template Matcher for Robust Natural Language Interpretation", Darpa Speech and Natural Language Workshop, 1991, or by U.S. Pat. No. 6,292,767, entitled "Method And System For Building and Running Natural Language Understanding Systems".

The natural language understanding module 103 supports dynamic updates of the knowledge base 107. The dependency parser 103b is trained on template data. For example, in the MP3 domain, the training data does not contain any specific song names, but rather a generic class name called songname. This may be true for other classes as well. During parsing, a new song database is supplied or updated. When an input sentence contains a full song name, the name is first identified and its class name songname is added to the existing word sequence as an alternative path. A more difficult case may be when song names are incomplete (a common case with distracted users).

A speech recognizer with class-based grammar (statistical or non-statistical), where a name class, such as, for example, song names, may be defined by another n-gram model trained on the song name set only, and the trained n-gram model is dynamically or statically inserted in the class-based grammar. In this regard, a recognizer for partial proper names may be provided, which labels the corresponding word sub-sequence with more than 90% accuracy when the song name database as described, for example, in U.S. patent application Ser. No. 10/892,724 entitled "A METHOD AND APPARATUS FOR PROPER AND PARTIAL PROPER NAME RECOGNITION", which was filed on Jul. 15, 2004, the entire disclosure of which is incorporated by reference herein. The modified input lattice with proper names is then given to the parser for analysis. In this regard, the exemplary embodiment and/or exemplary method of present invention may use certain techniques described, for example, by Weng et al. in "Parsing a Lattice with Multiple Grammars", 6$^{th}$ International Workshop on Parsing Technologies, ACL/SIGPARSE, Trento, 2000.

The semantic topic classifier 103d identifies the topic based on input from the statistical tagger 103a and the statistical dependency parser 103b. The semantic topic classifier 103d may use techniques such as, conditional maximum entropy modeling, memory-based modeling, and/or other methods to classify the input sentence into semantic categories. The models used in the semantic topic classifier 103d may be trained using labeled data.

Dialogue Management Module

Figure 1C:
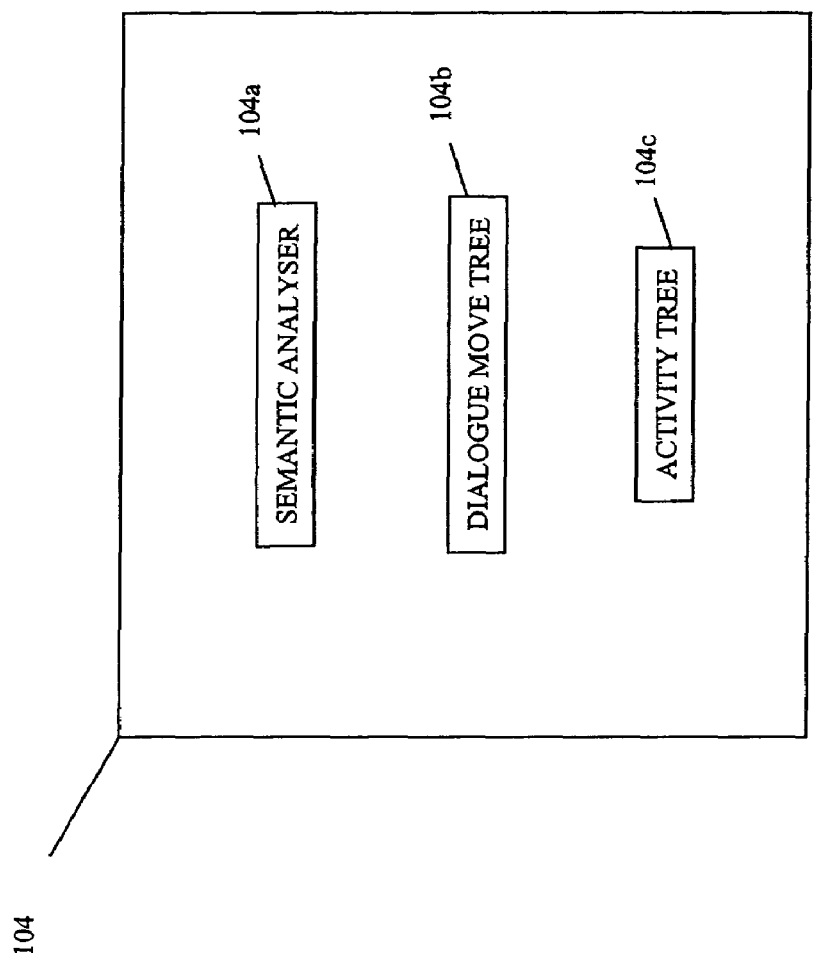
FIG. 1C shows an exemplary dialogue management module.

FIG. 1C shows an exemplary dialog management module 104 to manage and mediate the interaction of modules of the exemplary system 101. In this regard, the exemplary dialogue management module 104 may be implemented, for example, using a dialog management application available from the Stanford University Center for Study of Language and Information Interaction (CSLI), which is sometimes referred to as the "CLSI dialogue manager" or simply the "CDM". The CDM uses a dialogue-move approach, which is described, for example, by Larsson and Traum in "Information state and dialogue management in the TRINDI dialogue move engine toolkit", Natural Language Engineering, No. 6(3-4) 2000, to maintain dialogue context, which is then used to interpret incoming utterances (including fragments and revisions), resolve NPs, construct salient responses, track issues, etc. The dialogue state may also be used to bias speech recognition expectation and improve speech recognition performance. A more detailed description of the CDM may be found, for example, in Lemon et al., "Collaborative activities and multi-tasking in dialogue systems", Traitement Automatique des Langues (TAL), No. 43(2), 2002.

Multi-domain Design

The dialogue management module 104 supports a multi-domain environment and may be applied to a wide range of applications, including, for example, control of intelligent devices and tutoring. Different application domains may involve specifying a different grammar for surface-level generation, and a device-specific Activity Model (AM), which represents the tasks being managed by the dialogue management module 104 and their status so that an explicit reference to the task may be provided (e.g., "cancel that"). The Activity Model is a declarative specification of the capabilities of the agent or device with which the dialogue management module 104 interfaces, and includes linguistic information, such as mappings from verbs and their arguments to device-actions. See, for example, FIG. 3, which shows exemplary pseudo code for an exemplary activity model and language mapping implementation. The arguments that are marked as "required" may generate sub-dialogues when a user-command is given with missing arguments. In this regard, the Activity Model approach permits a "plug-n-play" functionality to be achieved so that when the exemplary dialog system is applied to a new domain, the entire dialog management module 104 need not be replaced.

The dialogue management module 104 includes a semantic analyser component 104a to construct semantic logical forms from a quasi f-structure from the natural language understanding module 103, and obtain dialogue-move types that require contextual information. For example, when the dialogue management module 104 accepts an utterance from the natural language understanding module 103, semantic meaning may be extracted using the current context and referents may be filled using a "salience list", which maintains representations of noun phrases (NPs) and objects that have been introduced into the conversation. Depending on the type of dialogue move, a new command may be added to the Activity Model (AM), or if the incoming utterance was a question, the knowledge management module 108 may be consulted and a resulting answer sent to the natural language understanding module 103. Some of the internal dialogue management module 104 components may allow a mix of domain-dependent and domain-independent processes, where default procedures are implemented independently from a particular domain, but some of their sub-processes may be easily configured to make use of domain-dependent information. Similarly, for new applications, the current implementation may also allow the expansion of logical forms or dialogue-move operators without disrupting the core CDM implementation.

Multi-threaded Context Management

The dialogue management module 104 is configured to manage multi-threaded, multi-topic conversations. This may be particularly important in the car situation, where the driver interacts with multiple devices, potentially interleaved. For example, an interaction to choose and book a restaurant may be interrupted by a cell phone request. In this regard, it is noted that when interacting with multiple devices users may desire to interact with a central controller rather than individually with each device.

The components of the dialogue management module 104 for supporting multi-threaded conversation include a dialogue move tree 104b and an activity tree 104c, which act as a framework for other dialogue context functionalities, such as, for example, generating task reports and grounding the user after a break in the conversation (e.g., "What were we talking about?").

The dialogue move tree 104b represents the historical context of a dialogue. An incoming utterance, classified as a dialogue move, is interpreted in context by attaching itself to an appropriate active node on the dialogue move tree. For example, an answer may attach to an active corresponding question node. A new conversation topic spawns a new branch and a dialogue move that cannot attach itself to the most recent active node may attach to an active node in another branch, which corresponds to a resumed conversation.

The activity tree 104c manages activities relevant to the current dialogue. When the user issues a command, this may result in a new activity being created and added to the activity tree 104c. Before the activity can actually be sent to the device for execution, the exemplary system 100 attempts to fully resolve it, including, for example, an attempt to resolve all noun phrases (NPs) or spawning a sub-dialogue to elicit further information. Revisions and corrections (e.g. "I meant/said . . . ") may involve editing an existing activity representation. Activity-execution is monitored on the activity tree 104c and changes may result in generated output, e.g. on failure or successful completion.

The dialogue move tree 104b and the activity tree 104c act as a framework for other dialogue context functionalities, such as, for example, generating task reports and grounding the user after a break in conversation (e.g., the exemplary system 100 may prompt the user with "what were we talking about"). The dialogue move tree 104b also provides implicit discourse structure for tasks such as reference resolution.

Knowledge Management Module

The knowledge manager (KM) 108 controls the access to knowledge base sources (such as, domain general knowledge and device information) and their updates. Domain knowledge is structured according to domain-dependent ontologies. The knowledge management module 108 may be implemented, for example, using Protégé, a domain-independent ontology tool available from Stanford University. Further details regarding Protégé may be available, for example, at the web site address of "protege.stanford.edu".

The knowledge management module 108 may be queried by the dialogue management module for instances matching semantic descriptions constructed from a command or query. For example, in the MP3 domain, a command to "play some rock music by Cher" may result in a query for objects of class song with genre=rock and artist=Cher, where genre and rock are (inherited) properties of the class song. When many results satisfy constraints from the user, the dialog management module 104 may use the ontology hierarchy to categorize them and output them in a succinct way to reduce the user's cognitive load. As explained above, the knowledge base module 107 may be dynamically updated with new instances at any point.

In addition, the knowledge management module 108 also serves as the repository of device information, such as the activity model (AM). Alternatively, the activity model (AM) may reside in the device/application manager 110. As a new device is made available, it registers its information with the knowledge management module 108, which then makes it available to the CDM 104.

Device/Application Manager

The device/application manager 110 determines which device is most appropriate for handling a given utterance (e.g., a command or a question) based on factors, such as, for example, the current device in context, linguistic cues that indicate a change in context, explicit addressing, and/or a best match of the utterance to a language template associated with a particular device's Activity Model. In this regard, the device/application manager 110 may isolate the device and/or application dependent information from the general dialogue management module 104 for the purpose of providing a plug-n-play capability. The device/application management module 110 includes state information, which describes the various possible states of a certain device or application and the possible set of values for the states. The activities applicable to the devices/applications, the functionalities provided therefrom, or the possible linguistic expressions that are used for a particular activity or functionality may be maintained and coordinated by the device/application manager 110. In this regard, the device/application-specific items may be encapsulated in a domain model, which may be published when the application is initially used. In particular, the linguistic expressions may be captured via statistical model associated with the natural language understanding module 103, a "tag" module, or via other forms.

Figure 4A:
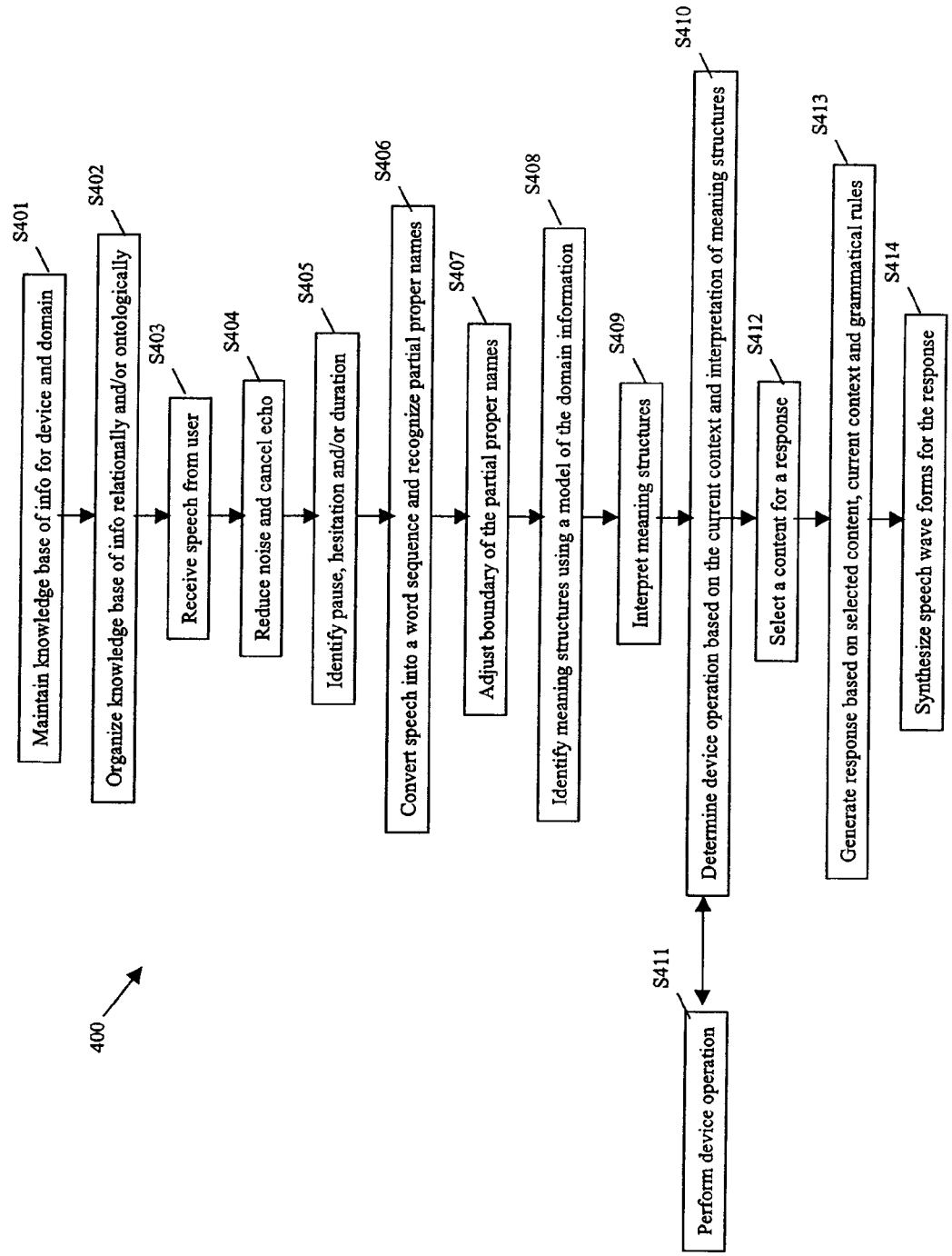
FIG. 4A shows an exemplary method to interactively converse with a cognitively overloaded user of a device.

FIG. 4A shows an exemplary method 400 to interactively converse with a cognitively overload user of a device. In step S401, the exemplary system 100 maintains a knowledge base of information regarding the device and a domain. In step S402, the exemplary system 100 organizes the information in a relational and/or ontological manner. In step S403, the exemplary system 100 receives speech from the user. In step S404, the exemplary system 100 reduces noise and cancels echo in the received speech. In step S405, the exemplary system 100 identifies a pause, hesitation and/or duration in the received speech. In step S406, the exemplary system 100 converts the speech into a word sequence and recognizes partial proper names in the word sequence. In step S407, the exemplary system 100 adjusts a boundary of the partial proper names to enhance an accuracy of the meaning structures. In step S408, the exemplary system 100 identifies meaning structures from the word sequence using a model of the domain information. In step S409, the exemplary system 100 interprets the meaning structures in a context of the conversation with the cognitively overloaded user using knowledge base. In step S410, the exemplary system 100 determines, based on the current context and interpretation of the meaning structures, an operation to be performed in connection with the device. In step S411, the exemplary system 100 performs the device operation. In step S412, the exemplary system 100 selects a content for a response to the cognitively overloaded user. In step S413, the exemplary system 100 generates the response based on the selected content, the context of the conversation, and grammatical rules. In step S414, the exemplary system 100 synthesizes speech wave forms for the response.

Figure 4B:
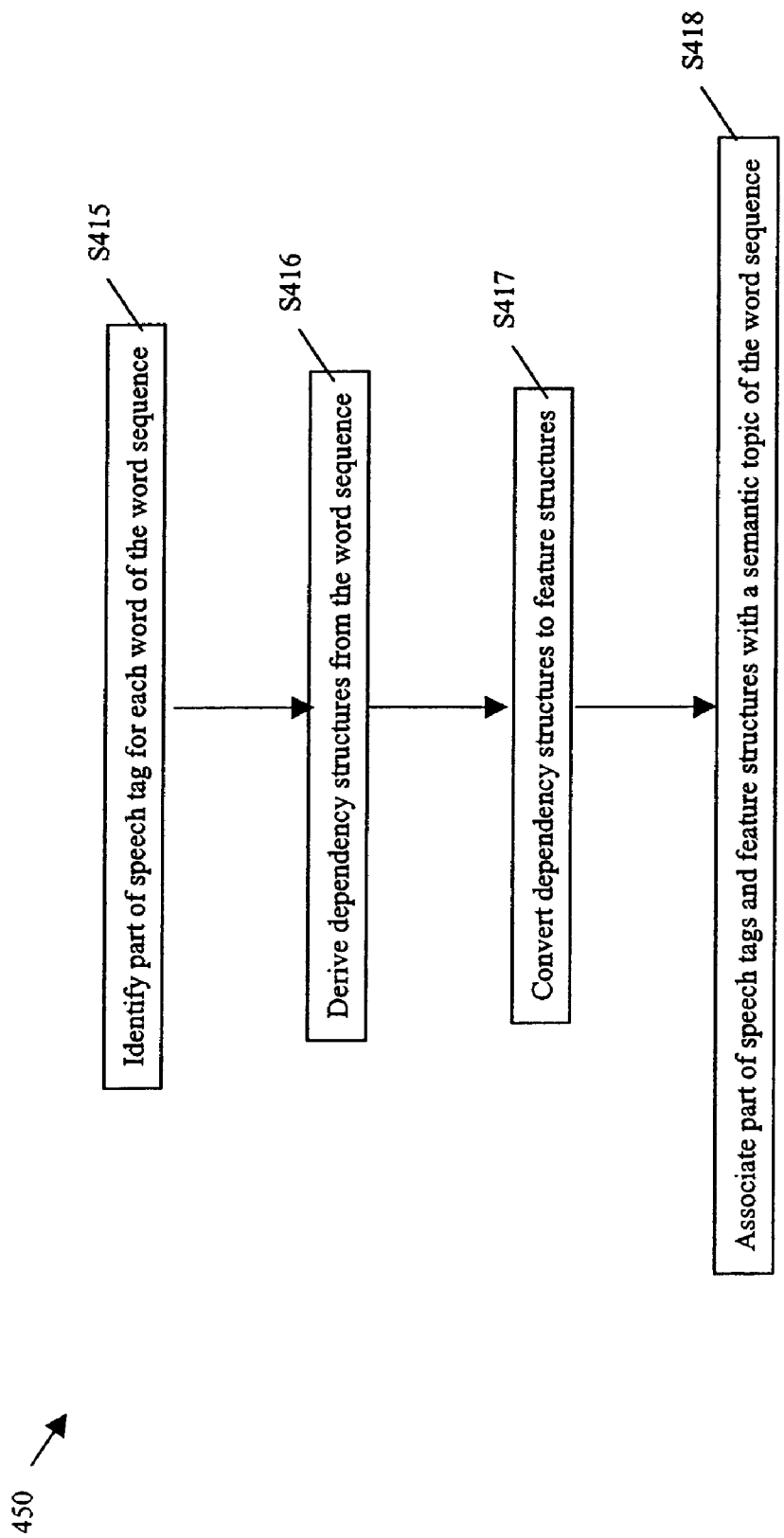
FIG. 4B shows an exemplary method to identify meaning structures in a word sequence converted from the speech received from a cognitively overloaded device user.

FIG. 4B shows an exemplary method 450 to identify meaning structures in a word sequence converted from the speech received from a cognitively overloaded device user. In step S415, the exemplary system identifies a part of speech tag for each word of the word sequence. In step S416, the exemplary system 100 derives dependency structures from the word sequence to dynamically adapt the model of the domain information. In step S417, the exemplary system 100 converts the dependency structures into feature structures. In step S418, the exemplary system 100 associates the part of speech tag and features structures with a semantic topic of the word sequence.

Figure 5:
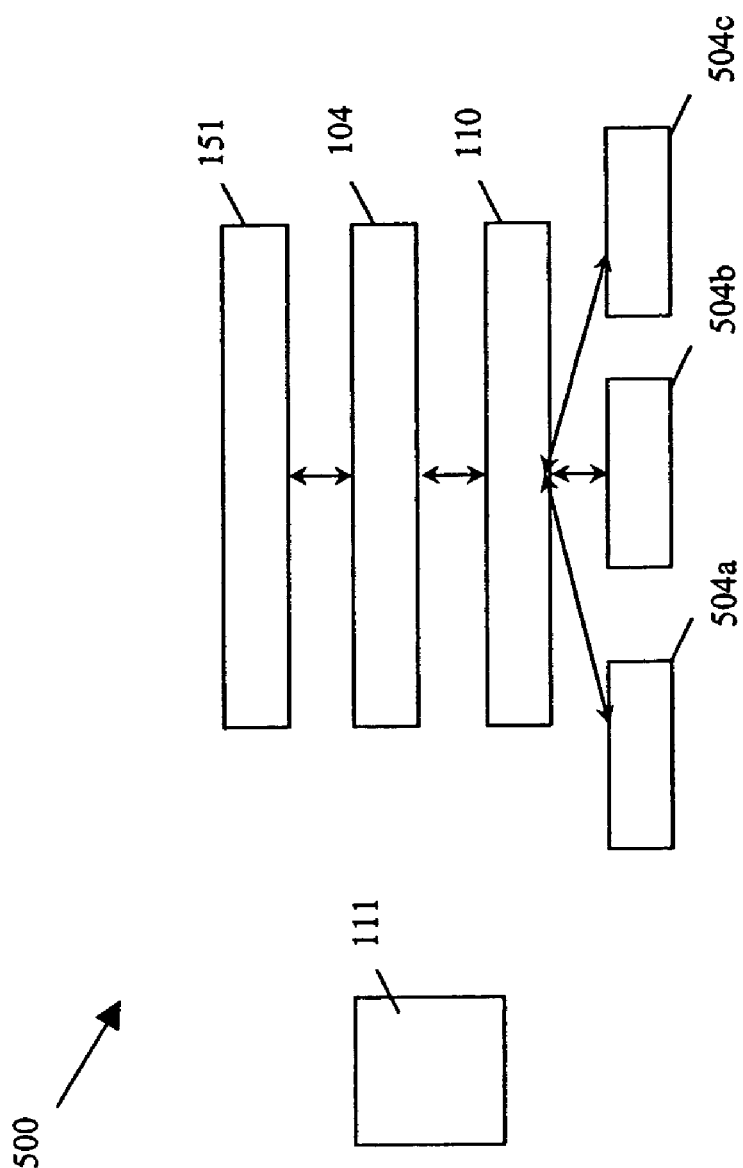
FIG. 5 shows an exemplary interface provided to the user of the exemplary system of FIG. 1, which integrates multiple devices.

FIG. 5 shows an exemplary integrated interface between a user 151 of the exemplary system 100 and multiple device agents 160a, 160b and 160c. In this exemplary embodiment, the user 151 is provided with a common interface to interact with the multiple device agents 160a, 16b and 160c. In this regard, a single instance of the dialogue management module 104 may facilitate communication between the user 151 and the device agents 160a, 160b and 160c. The device management module 110 may keep track of each device and act as a buffer between the dialogue management module 104 and the individual agents 160a, 160b and 160c. Accordingly, the device management module 110 may itself be an integrated agent with which the user 151 believes they are communicating.

To maintain device autonomy, however, each device agent 160a, 160b and 160c may be required to independently process the commands that apply to it, manage its own tasks, and add device-specific utterances to the dialogue management module 104 so that a more successful and natural task dialogue and execution may occur.

The dialogue management module 104 may be implemented using an adaptation from the CSLI Dialogue Manager (CDM), which provides a single-device system that uses a dialogue manager, dialogue move tree, task tree, and a simulation task tree to handle dialogue management and task execution.

According to an exemplary embodiment of the present invention, despite supporting multiple devices, the exemplary system 100 may be configured with only one dialogue management module 104 that handles all linguistic communication between the user 151 and the device agents 160a, 160b and 160c. In this regard, the user may feel as if they are only addressing a single agent/device, which has been shown to result in a more effective user interface. Hence, the user 151 may simply issue commands, such as, for example, "drive to the restaurant", or "turn up the volume," and may feel like they are talking to a single agent, and not to the GPS system and radio, respectively.

When the exemplary system 100 is configured with a singled dialogue management module 104, the dialogue management module 104 uses a task-oriented approach to route utterances to the correct agent. For example, when the user 151 makes an utterance, the dialogue management module 104 takes that utterance and places it on the DialogueMoveTree as it does in the single-device dialogue system. If the utterance is not related to any previous utterances (e.g., a command to one of the devices), the dialogue management module 104 may communicate with the device management module 110 to find out which device should receive the utterance. In this instance, the device management module 110 may identify the appropriate device to handle the utterance and act accordingly. If the utterance is in response to a conversational thread that already exists, however, the effects of that utterance may be automatically routed to the appropriate device.

Contextual Devices

The dialogue management module 104 may additionally keep track of the device in current linguistic context. Each time a device is explicitly addressed, or a command may be made that corresponds to a certain device, that device becomes the current device in context. A device may also become the current contextual device by making an utterance itself. This may be maintained, for example, by a device context management module 111, which makes sure that the device in context only remains in context for a logical amount of time before resetting. In other words, when a device becomes the device in context, a timer is started which records how long the device has been in context. At the end of a certain time period, the device in context is reset to null. The timer restarts each time the device, or a different one, is addressed or says an utterance. Hence, the device context management module 111 may be coordinate and/or regulated the taking of turns. In this regard, the device in context may show up in the "CAR" main panel that appears when you run MultideviceApp, or CarApp for the NIST project.

Task-Related Dialogue

To facilitate task-related communication between the user 151 and the devices, an integrated TaskTree may be maintained by the dialogue management module 104, which represents all tasks that each agent has handled. The TaskTree may be synchronized with each agent's task execution management in their SimTaskTree, as described below, so that the dialogue management module 104 may provide feedback to the user about the progress, success and failure of tasks belonging to any and all agents. Thus, reports about task status, completion, failures, etc. may still be generated by the TaskTree.

Alternatively, each device may be responsible for device-specific task-oriented dialogue. For example, if given an ambiguous command, it may be the device's responsibility to resolve the ambiguity and continue with task execution. These utterances and queries may be handled, for example, in the same manner as similar queries in a single-device dialogue system. A sample dialogue involving such device-generated queries is shown in FIG. 6.

Distributed Task Management

According to an exemplary embodiment and/or exemplary method of the present invention, task management may involve requiring each device and/or device agent to autonomously and separately manage its own tasks. In this regard, when initially given a user command by the dialogue management 104, the device management module 110 may build a set of generic task properties, using the class MultiDeviceTaskProperties. These properties represent a basic, domain-independent idea of the task corresponding to the user command. The slots of these properties are normal NL slots, such as "command", "direct_object" and "adjectives". Once these properties are built, the device management module 110 sends a copy of these properties to the devices, who each reply back whether they can definitely handle the command, maybe handle the command, or can definitely not handle the command. The current device in context is given the first chance to say that it can, and if it returns that it can definitely handle it then it is automatically given the task. Otherwise, the answers from all devices are compiled and, if there is ambiguity (i.e. two devices can 'definitely' handle the task) then a query is generated to ask the user which device they would like to handle the utterance. When an appropriate device is found, then that command is assigned to that device, the appropriate nodes are added to the TaskTree and the device's SimTaskTree, and the device handles the rest of task execution and communication itself.

Device Registration

In order for a device to participate in the integrated system 100, it may be required to fulfill several requirements, including, for example, requirements related to identification, task functionality and system-specific functionality.

In regard to the requirements related to identification, the device may be required to have a unique identification string so that the device management module 110 may tkeep track of each device. Each device may have a DeviceType (i.e., UAV), and a unique DeviceName (i.e., UAV1). Everything such as Ifs, task management, etc., may use the DeviceName as the identifying tag.

In regards to requirements related to task functionality, the device may be required to have the ability to decide whether, given a generic task description, it has the ability to handle and execute that task as described above. This functionality may be used in both single-device and single-agent tasks as well as multiple-device tasks. It may be implemented by a series of device-specific functions that can be found in the device's code. They take in MultiDeviceTaskProperties, or a GenericSlotSet, and use those properties to determine whether or not they feel like they can execute the task described by the properties.

In regards to requirements related to system-specific functionality, to be compatible with the exemplary system 100, the device may be required to supply other, system-specific classes and functionality. This may include, for example, a TaskLFParser, which takes the generic task properties and builds from then the device-specific task properties, the device's activity model, NPResolver, etc. All of these classes (look in the RestaurantDevice for an example of what must be implemented) may be utilized to provide device-specific task and dialogue handling. Each device's own DeviceStarter class may also fall under this category.

Task Assignment

To maximize or at least improve the reliability of assigning tasks to devices, several factors may be considered by the device management module 110 when it chooses a device to handle a task. It may give first priority to the current device in context. If that device can handle the user command, then it is automatically assigned to it and task execution ensues. Otherwise, the device management module 110 may ask each device whether or not it has the ability to handle this task, and compiles a list of devices that respond affirmatively. If more than one device thinks it can handle a certain task, a query may be generated asking the user to more specifically indicate the device they want used. A sample dialogue is shown in FIG. 6. Once this query has been answered, the chosen device is notified so it can begin to handle the command. Exemplary pseudo code for an exemplary implementation of task assignment is provided in FIG. 7.

Task Handling and Execution

As stated earlier, each task may be responsible for executing and maintaining its own tasks. It may do this by maintaining its own SimTaskTree. These SimTaskTrees are, as previously mentioned, kept synchronized with the dialogue management module's single TaskTree to facilitate task-related dialogue—i.e. updates and reports. Thus, each device may continuously update the tasks on its own SimTaskTree according to how its execution is going, (i.e. whether the task is current, done or failed), and these updates may then be picked up by the TaskTree to keep it current as well. As previously mentioned, this may allow the dialogue management module 104 to provide feedback to the user about the progress of all tasks. In other words, the TaskTree may be thought of as a composite of each individual devices' SimTaskTrees. The individual devices only have on their SimTaskTree tasks that they themselves are executing (or have executed, etc), with only a few exceptions with respect to team tasks described below. The TaskTree, however, has a combination of all the tasks from all the devices, and thus in a sense is the conglomeration of each individual SimTaskTree, and a representation of everything going on in the system.

Example Dialogue

FIG. 2 shows an exemplary dialogue 200 between a user and the exemplary system 100 of FIG. 1A, involving control of an MP3 music-player. The exemplary dialog 200 illustrates certain functions and interactions that the exemplary system 100 may handle, including, for example, extensive noun phrase (NP) resolution based on context and external situation, dynamic content updates, dis-ambiguation, multi-threaded conversation, and complex proper names.

The main functionalities are illustrated via an actual sample dialogue for controlling an MP3 music player.

Data Collection

To improve and evaluate the performance of the exemplary system 100 dialogue data may be collected for a particular task. In this regard, a "Wizard of Oz" (WOZ) approach may be used, in which an experiment subject talks to a human being in another room pretending to be a smart machine. This setup may be required to design a high quality dialogue system that simulates human behavior in task-oriented interactions. This is partly because the WOZ approach may set the right expectations for the user during the conversation in terms of language complexity. Consequently, the WOZ approach may avoid being trapped by the difficult problems of understanding human-human conversation, which may be beyond the capability of the state-of-the-art NLP techniques.

To simulate a cognitively overloaded scenario, a driving simulator may be used as an occupying task. As part of the simulator, a video game called Midtown Madness 1 may be used, which is situated in downtown Chicago. A steering wheel with force feedback is mounted in front of the game display. Two divided rooms (called subject room and wizard room) may be set up so that the subject and wizard do not see each other. The wizard acts as an "deal'" dialogue system and the subject interacts with the wizard without knowing or seeing her. The wizard can see the game screen through a video splitter so that she knows the subject's current situation in the driving scene. When the subject needs navigation or entertainment information, she presses a push-to-talk (PTT) button on the wheel and talks into a head-mounted microphone. The wizard only hears the subject speech when PTT is pressed.

The speech from both subject and wizard is recorded to a hard disk by recording software. One scenario may be constructed for operating the MP3 player, where the subjects are asked to create two song lists while they are driving around the city. To create the song lists, the subjects may query about songs in their collection, listen to songs, and add to or delete songs from their lists. This scenario provides multi-threaded dialogues.

What is claimed is:

1. A dialog system, comprising:
   a memory circuit including a knowledge base to store device information regarding a plurality of devices and corresponding domains, and to categorize the information in at least one of a relational and an ontological manner, wherein the respective device information of each one of the plurality of devices is encapsulated in the knowledge base in isolation from all other device information in the knowledge base and from device-independent information in the knowledge base for plug-n-play of the domains; and
   a processor configured to execute:
      a speech recognition module to receive speech from a user and convert the speech into a word sequence, and to recognize at least one of full and partial proper names using a statistical model;
      a natural language understanding module to identify meaning structures from the word sequence using a statistically dependent model of a selected one of the domains and based on the device information in the knowledge base regarding the domain, and to adjust a boundary of the at least one of the full and partial proper names without using the statistical model;
      a dialogue management module to interpret the meaning structures in a context of the conversation using the device information in the knowledge base regarding the domain, and to construct a content of a response;
      a device/application manager to interface between the plurality of devices and the dialogue management module;
      a response generation module to select content and generate the response based on the context and grammatical rules; and
      a speech synthesis module to synthesize speech wave forms for the response.

2. The dialog system of claim 1, wherein the plurality of devices include at least one of a mobile telephone, a navigation system, a point of interest service, an audio device, an in-car device, and an MP3 player.

3. The dialog system of claim 1, further comprising:
   a speech enhancer to provide noise reduction and echo cancellation of the received speech.

4. The dialog system of claim 1, further comprising:
   a prosody detection module to detect at least one of intonation, pause, and duration of the received speech.

5. The dialog system of claim 1, wherein the dialog system is distributed to allow dynamic registration of at least one of a new module and a new device.

6. The dialog system of claim 1, wherein the natural language understanding module includes a statistical tagger to assign part of speech tags to the word sequence, a statistical dependency parser to form dependency relations using conditional probability and mutual information, and a feature mapper to an Extensible Markup Language representation of the word sequence using the dependency relations.

7. The dialog system of claim 1, wherein the dialog management module is configured to support a multi-domain environment.

8. The dialog system of claim 1, wherein the dialog management module is configured to manage multi-thread conversations.

9. The dialog system of claim 1, wherein the dialog management module is configured to support a device-specific activity model.

10. The dialog system of claim 1, wherein the dialog management module includes a semantic analyzer.

11. The dialog system of claim 1, wherein the dialog management module is configured to support a dialog move tree.

12. The dialog system of claim 1, wherein the dialog management module is configured to support multi-topic conversations.

13. The dialog system of claim 1, wherein the dialog system at least one of adjusts and verifies the partial proper names.

14. The dialog system of claim 1, wherein the speech recognition module recognizes the at least one of full and partial proper names by using a statistical model trained from at least one of a plurality of proper name databases.

15. The dialog system of claim 1, wherein:
   the dialogue system distinguishes between definite and indefinite noun phrases of received speech and resolves at least one of definite and indefinite noun phrases of the received speech according to context; and
   the response generation is performed in accordance with the resolved noun phrases.

16. The dialog system of claim 1, wherein the device/application manager selects one of the plurality of devices to handle a task based on at least one of (a) which device is currently in context, (b) linguistic cues indicating a change in context, and (c) explicit addressing.

17. The dialog system of claim 16, wherein the device/application manager selects the currently-in-context device to handle the task responsive to a determination that the currently-in-context device is capable of handling the task.

18. The dialog system of claim 17, wherein the device/application manager selects one of the plurality of devices other than the currently-in-context device if the currently-in-context device is determined to be incapable of handling the task and the one of the plurality of devices other than the currently-in-context device is determined to capable of handling the task.

19. The dialog system of claim 18, wherein the device/application manager queries the user in response to a determination that more than one of the plurality of devices is capable of handling the task.

20. The dialog system of claim 1, wherein:
the device/application manager selects one of the plurality of devices to handle a task based on which device is in context; and
a particular device is determined to be the device in context when the particular device is one of (a) expressly addressed and (b) currently in use.

21. The dialog system of claim 20, wherein the device in context is reset to a non-context status after a pre-determined amount of time.

22. A computer-implemented method of interactively conversing with a cognitively overloaded user of a device, the method comprising:
maintaining a knowledge base of information regarding the device and a domain;
organizing the information in at least one of a relational manner and an ontological manner;
receiving, by a processor of the computer, speech from the user;
converting, by the processor, the speech into a word sequence;
recognizing, by the processor, at least one of a full and partial proper name in the word sequence using a statistical model;
identifying, by the processor, meaning structures from the word sequence using a model of the domain information;
adjusting, by the processor, a boundary of the at least one of the full and partial proper names to enhance an accuracy of the meaning structures using a name database and without using the statistical model;
interpreting, by the processor, the meaning structures in a context of the conversation with the cognitively overloaded user using the knowledge base;
selecting, by the processor, a content for a response to the cognitively overloaded user;
generating, by the processor, the response based on the selected content, the context of the conversation, and grammatical rules; and
synthesizing speech wave forms for the response.

23. The method of claim 22, further comprising: at least one of:
reducing a noise of the received speech; and
canceling an echo of the received speech.

24. The method of claim 22, further comprising:
registering the device to advertise a capability of the device in linguistic semantic form; and
selecting the device based on at least one of the capability of the device in linguistic semantic form and the context of the conversation, for all types of user requests.

25. The method of claim 22, further comprising:
identifying at least one of a pause, hesitation, and duration in the received speech.

26. The method of claim 22, further comprising:
forming a proper named class in a class-based grammar by training n-gram models on the named set only; and
dynamic inserting the trained n-gram models in the class-based grammar as the proper name class.

27. The method of claim 22, wherein the identifying of the meaning structures further includes:
identifying a part of speech tag for each word of the word sequence;
deriving dependency structures from the word sequence to dynamically adapt the model of the domain information;
converting the dependency structures to feature structures; and
associating the part of speech tag and features structures with a semantic topic of the word sequence.

28. The method of claim 22, wherein the adjustment of the boundary of the at least one of the full and partial proper names is achieved by expanding the boundary by at least one word.

29. The method of claim 22, further comprising:
determining one of the plurality of devices for handling an utterance based on at least one of a current device in context, linguistic cues indicating a change in context, and explicit addressing.

30. A hardware-implemented storage medium having stored thereon a set of instructions executable by a processor to perform the following:
maintaining a knowledge base of information regarding a device and a domain;
organizing the information in at least one of a relational manner and an ontological manner;
receiving speech from a user of the device;
converting the speech into a word sequence;
recognizing a partial proper name in the word sequence using a statistical model;
identifying meaning structures from the word sequence using a model of the domain information;
adjusting a boundary of the partial proper names to enhance an accuracy of the meaning structures using a name database and without using the statistical model;
interpreting the meaning structures in a context of the conversation with the user using the knowledge base;
selecting a content for a response to the user;
generating the response based on the selected content, the context of the conversation, and grammatical rules; and
synthesizing speech wave forms for the response.

* * * * *